(12) United States Patent
Hamlyn et al.

(10) Patent No.: US 7,819,160 B2
(45) Date of Patent: Oct. 26, 2010

(54) DEVICE FOR USING FIBERS WITH FLEXIBLE FIBER-ROUTING TUBES

(75) Inventors: Alexander Hamlyn, Ploemeur (FR); Yvan Hardy, Lorient (FR)

(73) Assignee: Coriolis Composites, Lyons (FR)

( * ) Notice: Subject to any disclaimer, the term of this patent is extended or adjusted under 35 U.S.C. 154(b) by 559 days.

(21) Appl. No.: 11/740,055

(22) Filed: Apr. 25, 2007

(65) Prior Publication Data

US 2008/0202691 A1 Aug. 28, 2008

(30) Foreign Application Priority Data

Feb. 28, 2007 (FR) .................................. 07 01453

(51) Int. Cl.
*B65H 81/00* (2006.01)
(52) U.S. Cl. .......................... 156/425; 156/433; 156/441
(58) Field of Classification Search .................. 156/173, 156/175, 172, 169, 433, 441
See application file for complete search history.

(56) References Cited

U.S. PATENT DOCUMENTS

| | | | |
|---|---|---|---|
| 494,910 A | | 4/1893 | Wells |
| 1,100,829 A | * | 6/1914 | Joseph ........................ 138/119 |
| 1,164,303 A | * | 12/1915 | Nicewarner .................. 138/119 |
| 1,301,354 A | * | 4/1919 | Baird ........................... 138/119 |
| 3,238,084 A | | 3/1966 | Hawkins |
| 3,265,795 A | | 8/1966 | Medney |
| 3,300,355 A | | 1/1967 | Adams |
| 3,563,122 A | | 2/1971 | De Neui |
| 3,662,821 A | | 5/1972 | Saxon |
| 3,713,572 A | * | 1/1973 | Goldsworthy et al. .......... 226/7 |
| 3,856,052 A | * | 12/1974 | Feucht ........................ 138/119 |
| 4,118,814 A | | 10/1978 | Holtom |
| 4,242,160 A | | 12/1980 | Pinter et al. |
| 4,488,466 A | | 12/1984 | Jones |
| 4,569,716 A | | 2/1986 | Pugh |
| 4,574,029 A | | 3/1986 | Murray |
| 4,699,031 A | | 10/1987 | D'Angelo et al. |
| 4,735,672 A | | 4/1988 | Blad |

(Continued)

FOREIGN PATENT DOCUMENTS

DE 1 922 327 8/1965

(Continued)

OTHER PUBLICATIONS

File History for U.S. Appl. No. 11/666,537, filed Nov. 26, 2008.

(Continued)

*Primary Examiner*—Jeff H Aftergut
(74) *Attorney, Agent, or Firm*—Patterson Thuente Christensen Pedersen, P.A.

(57) ABSTRACT

A fiber application machine, for making components out of composite materials, that includes a system for displacing a fiber application head, fiber storage means, and fiber conveying means for conveying fibers from said storage means to the application head. The conveying means include flexible tubes connecting the storage means to the application head, each flexible tube being fitted with at least one longitudinal flexible blade of rectangular transverse cross-section, said flexible blade being placed substantially parallel to the plane of transport of the fiber received in the inner passage of the flexible tube.

10 Claims, 2 Drawing Sheets

U.S. PATENT DOCUMENTS

| | | | |
|---|---|---|---|
| 4,849,150 | A | 7/1989 | Kittaka et al. |
| 4,976,012 | A | 12/1990 | McConnell |
| 4,990,213 | A | 2/1991 | Brown et al. |
| 4,997,513 | A | 3/1991 | Lengen et al. |
| 5,078,592 | A | 1/1992 | Grimshaw et al. |
| 5,110,395 | A | 5/1992 | Vaniglia |
| 5,290,389 | A | 3/1994 | Shupe et al. |
| 5,700,347 | A | 12/1997 | McCowin |
| 6,026,883 | A | 2/2000 | Hegerhorst et al. |
| 6,073,670 | A | 6/2000 | Koury |
| 6,256,889 | B1 | 7/2001 | Zuro |
| 6,490,990 | B1 | 12/2002 | Hamlyn et al. |
| 6,605,171 | B1 | 8/2003 | Debalme et al. |
| 7,048,024 | B2 | 5/2006 | Clark et al. |
| 2002/0014715 | A1 * | 2/2002 | Wirth et al. ............. 264/138 |
| 2002/0090408 | A1 | 7/2002 | Dahl et al. |
| 2002/0152860 | A1 | 10/2002 | Machamer |
| 2003/0118681 | A1 | 6/2003 | Dahl et al. |
| 2004/0031879 | A1 | 2/2004 | Kay et al. |
| 2005/0023414 | A1 | 2/2005 | Braun |
| 2005/0037195 | A1 | 2/2005 | Warek |
| 2005/0039844 | A1 | 2/2005 | Engwall et al. |
| 2005/0061422 | A1 | 3/2005 | Martin |
| 2006/0162143 | A1 | 7/2006 | Nelson et al. |
| 2006/0169118 | A1 | 8/2006 | Morehead |
| 2006/0180264 | A1 | 8/2006 | Kisch et al. |
| 2006/0231682 | A1 | 10/2006 | Sarh |
| 2007/0044919 | A1 | 3/2007 | Hoffmann |
| 2008/0093026 | A1 | 4/2008 | Naumann |
| 2008/0157437 | A1 | 7/2008 | Nelson et al. |
| 2008/0196825 | A1 | 8/2008 | Hamlyn |
| 2008/0216961 | A1 | 9/2008 | Hamlyn et al. |
| 2008/0216963 | A1 | 9/2008 | Hamlyn et al. |
| 2009/0229760 | A1 | 9/2009 | Hamlyn et al. |
| 2009/0311506 | A1 | 12/2009 | Herbeck et al. |

FOREIGN PATENT DOCUMENTS

| | | |
|---|---|---|
| DE | 37 43 485 A1 | 7/1989 |
| DE | 10 2007 009 124 A1 | 8/2008 |
| EP | 0 216 695 A1 | 4/1987 |
| EP | 0 241 251 A1 | 10/1987 |
| EP | 0 557 158 A1 | 8/1993 |
| EP | 0 753 394 A2 | 1/1997 |
| EP | 0 773 099 A1 | 5/1997 |
| EP | 0 626 252 B1 | 3/1999 |
| EP | 1 001 066 A2 | 5/2000 |
| EP | 1 177 871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 | 6/1989 |
| FR | 2 686 080 | 7/1993 |
| FR | 2 721 548 | 12/1995 |
| FR | 2 784 930 | 4/2000 |
| FR | 2 865 156 | 7/2005 |
| FR | 2 882 681 A1 | 9/2006 |
| FR | 2 913 365 | 9/2008 |
| GB | 2 268 705 A | 1/1994 |
| GB | 2 270 672 A | 3/1994 |
| GB | 2 292 365 A | 2/1996 |
| JP | 01281247 | 11/1989 |
| JP | 2005329593 | 12/2005 |
| WO | WO 95/20104 | 7/1995 |
| WO | WO 02/070232 A1 | 9/2002 |
| WO | WO 03/035380 A1 | 5/2003 |
| WO | WO 2006/060270 A1 | 6/2006 |
| WO | WO 2006/092514 A2 | 9/2006 |
| WO | WO-2006/092514 A2 * | 9/2006 |
| WO | WO 2008/149004 A1 | 12/2008 |
| WO | WO 2010/049424 A1 | 5/2010 |

OTHER PUBLICATIONS

File History for U.S. Appl. No. 11/740,057, filed Apr. 25, 2007.
File History for U.S. Appl. No. 11/740,060, filed Apr. 25, 2007.
File History for U.S. Appl. No. 11/740,064 filed Apr. 25, 2007.
Transaction History for U.S. Patent No. 6,490,990 Issued Dec. 10, 2002.
French Search Report dated Apr. 13, 2010 for French Application No. 09 54963.
French Search Report dated Apr. 15, 2010 for French Application No. 09 54964.

* cited by examiner

DEVICE FOR USING FIBERS WITH FLEXIBLE FIBER-ROUTING TUBES

RELATED APPLICATION

The present application claims priority to French Application No. 0701453 filed Feb. 28, 2007, which is incorporated herein in its entirety by reference.

FIELD OF THE INVENTION

The present invention relates to a fiber application machine, for making components out of composite materials, and more particularly fiber conveying means particular to a machine of this kind for conveying the fibers between fiber storage means and the application head.

BACKGROUND OF THE INVENTION

There are known fiber application machines, commonly known as fiber placement machines, for the application to a mold of a wide strip formed of a number of flat fibers, of the ribbon type, impregnated with resin, particularly carbon fibers impregnated with a thermosetting or thermoplastic resin. These machines include a system for displacing a fiber application head, said head comprising an application roller intended to come into contact against the mold to apply the strip and means for guiding the fibers onto said application roller, fiber storage means and fiber conveying means for conveying fibers from said storage means to the application head.

The conveying means are generally formed of a plurality of pulleys built onto the different axes of a gantry type displacement system. The storage means, formed of a fiber bobbin creel, are also built into the displacement system as close as possible to the placement head. These different built-in elements are cumbersome and heavy, and restrict the fiber application speed. These machines do not allow fibers to be placed in small dimension components or on some female molds because of the space requirement and the limited runs of the different axes.

PCT publication WO2006/092514 proposes using conveying means formed of flexible tubes connecting the storage means to the application head, each flexible tube being able to receive one fiber into its inner passage. The flexible tubes are anchored by their ends to the application head and to the storage means respectively by upstream and downstream anchoring means, and have sufficient length and flexibility not to restrict the movements of the head displacement system.

Flexible tubes of this kind form conveying means that are simple in design, do not take up much space and are of reduced cost, making it possible to obtain high movement speeds, to place remotely the displacement system storage means, to eliminate the motor-driven slack recovery systems for fiber bobbins, to isolate the fibers from the outside, to simplify the application head displacement system, and particularly to use a displacement system such as a multi-articulated arm of the six axis robot type. These flexible tubes are to advantage associated with a tension limiting system, described in detail in the aforementioned patent document, able to exert tensile stress on the fibers coming from the storage means thereby limiting the take-up tension of the fibers at the application roller.

These flexible tubes cannot however prevent the fibers from turning over during some robot displacements, because of excess bending of the flexible tubes and/or excess friction of the fibers in the flexible tubes.

SUMMARY OF THE INVENTION

The purpose of the present invention is to propose a machine that overcomes the aforementioned drawbacks, which is straightforward in design and requires little space, while guaranteeing good fiber conveyance.

To this end, the purpose of the present invention is a fiber application machine that includes
- a system for displacing a fiber application head that comprises an application roller and means of guiding the fibers onto said application roller,
- fiber storage means, and
- fiber conveying means for conveying fibers from said storage means to the application head, said conveying means including flexible tubes connecting the storage means to the application head, each flexible tube being able to receive one fiber into its inner passage, the flexible tubes being anchored at the end to the application head and to the storage means respectively via upstream and downstream anchoring means, wherein each flexible tube of the fiber conveying means is fitted with at least one longitudinal flexible blade of rectangular transverse cross-section, extending over the whole length of the flexible tube and integral with the flexible tube over substantially the whole of its length, said flexible blade being arranged substantially parallel to the plane of transport of the fiber received in the inner passage of the flexible tube.

According to the invention, each flexible tube is fitted with a flexible blade restricting or preventing transverse bending of the tube in the plane of the blade, which allows the risks of the fiber turning over in the inner passage of the flexible tube parallel to the blade to be eliminated, or at the very least restricted. The flexible tube may perform bending movements in a direction perpendicular to the plane of the blade and twisting movements to allow the fiber placement head to move in all directions.

According to one embodiment, said flexible blade is made of metal and is integral with a flexible tube made of plastic material, preferably high-density polyethylene, better still anti-static high-density polyethylene. The flexible blade may be coupled to the outer surface of the flexible tube using assembly means, for example by means of adhesive ribbon. As a variant, the flexible blade is embedded in the wall of the tube, for example when the tube is extruded.

In one representative embodiment, the flexible tubes are of rectangular cross-section, the flexible blade being placed along one of the two large dimension sides of the flexible tube.

The conveying means can additionally include fluidization means able to fluidize a fiber when it is transported in the inner passage of a flexible tube. According to one embodiment, the fluidization means include air injection means able to inject air, or any other type of gas, into the inner passage of each flexible tube, at its downstream end part, so as to create an airflow in the direction of transport of the fibers. The airflow is preferably conditioned, in other words temperature and/or humidity controlled, and purified to avoid any pollution of the fibers. The fluidization means may also include vibration means able to make said flexible tubes vibrate. Said fluidization means can be mounted on the upstream anchoring means.

The flexible tubes are preferably anchored in at least one row by their end parts to the application head and to the storage means respectively by common upstream and downstream anchoring means, in order to receive and deliver fibers in the form of a layer. Said common upstream and downstream anchoring means each include, for example, two plates coupled to each other and between which the tubes fitted with their blade are jammed in a row substantially edge to edge, the two plates being assembled by a flexible connection of the silentbloc type to the machine.

According to one embodiment, the machine includes at least one tension limiting system between the application head and the storage means, in order to exert a tensile stress on the fibers, thereby limiting the take-up tension of the fibers at the application head, the flexible tubes including first sections anchored at the end to storage means and to the limiting system via first common upstream and downstream anchoring means respectively, and second sections anchored at the end to the limiting system and to the fiber application head via second common upstream and downstream anchoring systems respectively.

The displacement system is able to displace the application head in at least three directions perpendicular to each other. Said displacement system include can include a robot including a wrist or poly-articulated arm at the end of which said application head is mounted. The displacement system may be formed by a multi-articulated arm of the standard six axis robot type, placed on the floor or mounted on a linear axis or a gantry.

The fiber storage means may include a creel in the case of fibers packaged in the form of bobbins and/or racks in the case of fibers conditioned in the form of bundles or in cartons. These storage means may be placed on the floor, for example in the case of a standard fixed robot, or be mounted on an element of the displacement system, for example on a follower carriage sliding on the linear axis of the robot.

BRIEF DESCRIPTION OF THE DRAWINGS

The invention will be better understood, and other purposes, details, characteristics and advantages will emerge more clearly from the following detailed explanatory description of one particular currently preferred embodiment of the invention, with reference to the appended drawings in which.

DETAILED DESCRIPTION OF THE DRAWINGS

Figure 1:
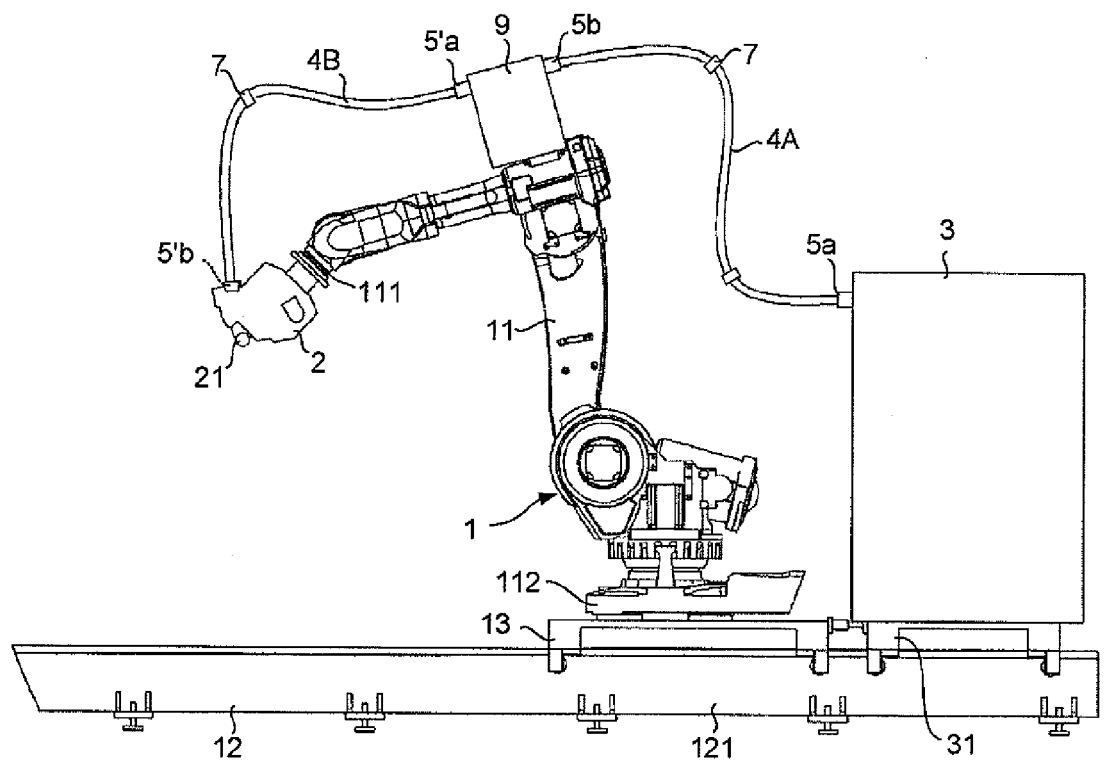
FIG. 1 is a diagrammatic side view of a placement machine according to the invention.

With reference to FIG. 1, the placement machine includes a displacement system 1, formed of a multi-articulated arm 11, of the six axis robot type, known per se, mounted mobile on a linear axis 12, and application head 2 mounted at the end wrist 11a of the multi-articulated arm, fiber storage means 3, conveying means 4A, 4B for conveying fibers from said storage means to the application head, and at least one tension limiting system 9.

The multi-articulated arm 11 is anchored by its base plate 112 to a carriage 13 mounted to slide on the linear axis 12, said linear axis being constituted by two parallel rails 121 anchored to the floor. The carriage is fitted with drive means, for example of the motor-driven roller type, automatically controlled by a control unit for the displacement of the placement head along these rails.

The fiber application head 2, also called a fiber placement head, includes, in a known way, an application roller 21 able to come into contact with the mold in order to apply a strip formed of several fibers pre-impregnated with resin.

The machine is provided for the application of fibers, for example of the carbon fiber type F, packaged in the form of bobbins. The storage means are formed of a creel, shown in the drawing with the reference number 3, to receive the fiber bobbins. Each bobbin is mounted on a mandrel of the creel, to advantage fitted with an automatic braking system automatically controlled in a closed loop as a function of the tension of the fiber, as described in patent document EP 697990. The creel is also mounted on a following carriage 31, placed on the rails 121 and mechanically connected to the carriage 13 carrying the robot.

One or more tension limiting systems, as described in detail in the aforementioned PCT publication WO2006/092514, including a set of motor-driven parallel cylinders over which the fibers move without going right round them, may be provided between the creel and the application head to reduce fiber tension at the roller. In this embodiment, a tension limiting system 9 is mounted on the multi-articulated arm of the robot.

The machine includes a control unit (not shown) to control the displacement of the robot in accordance with programmed sequences, the fiber placement head, particularly the jacks of individual cutting systems and re-routing systems, as well as the tension limiting system. The electrical, pneumatic and/or hydraulic circuits for controlling the placement head are placed in a pipe (not shown) extending from the placement head to the control unit, along the robot arm.

The conveying means include flexible tubes as described in the aforementioned patent document, but each flexible tube is, according to the invention, fitted with a flexible rigidifying blade.

The fibers are conveyed individually in flexible tubes from the creel 3 to the fiber placement head 2. The fibers pass in the first flexible tube sections, known as first tubes, anchored at the ends to the creel 3 and to the limiting system 9 respectively by first common upstream 5a and downstream 5b anchoring systems, then in second flexible tube sections, known as second tubers, anchored at the end to the limiting system and to the fiber placement head respectively by second common upstream 5'a and downstream 5'b anchoring systems. The first and second tubes are gathered together respectively into a first and a second bundle shown diagrammatically with the reference numbers 4A and 4B in FIG. 1. The first and second tubes are brought together in bundles by one or more rings 7, said rings preventing the tubes from separating from each other but allowing longitudinal displacement of the tubes relative to each other.

Figure 2:
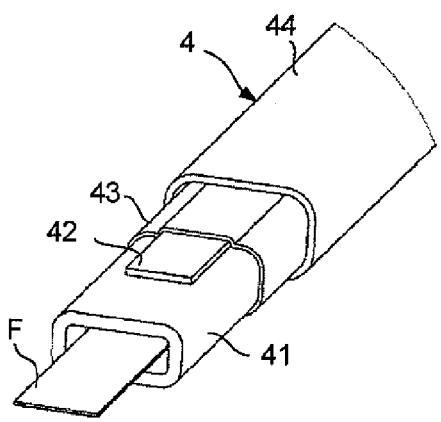
FIGS. 2 and 3 are a partial perspective view and a transverse cross-section view respectively of a flexible conveying tube according to the invention.
Figure 3:
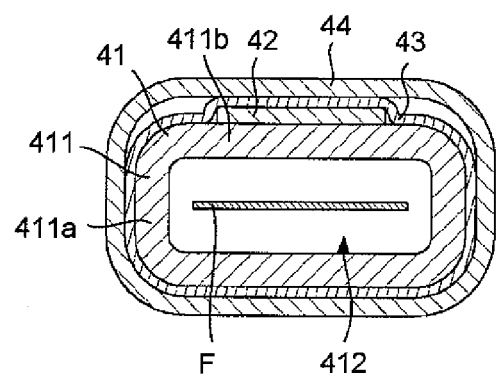

With reference to FIGS. 2 and 3, each flexible tube 41 has a wall 411 of rectangular transverse cross-section, with two small sides 411a and two large sides 411b. Each flexible tube is fitted externally with a flexible metal blade 42, also known as a foil. The metal blade is assembled against the outer large side surface 411b, over approximately the whole length of the flexible tube, the blade having a width smaller than or equal to that of a large side, preferably smaller. This assembly is made by means of an adhesive strip 43 wound in a helical way around the flexible tube and the blade to flatten it against the flexible tube. A protective sheath 44, made of fabric for example, covers the unit formed by the tube, the blade and the adhesive strip. The flexible tube thus fitted with its blade and covered with a sheath is denoted by the reference number 4.

Each tube is intended to receive a flat fiber F in its inner passage 412 of rectangular cross-section, substantially parallel to its large side and therefore parallel to the metal blade. The metal blade prevents any transverse bending of the flexible tube in the plane of the blade, but allows longitudinal bending of the flexible tube in a direction perpendicular to the plane of the blade as well as twisting of the flexible tube. During displacement of the robot for fiber placement operations, the flexible tubes will be distorted by bending perpendicular to the plane of the blade and/or twisting, such that the fiber F remains completely flat parallel to the metal blade.

By way of example, in order to convey fibers 6.35 mm in width, the tubes have an inner rectangular cross-section of 8×2 mm, with a wall thickness of 1 mm, in other words an outer cross-section of 10×4 mm. The flexible tubes are made of a flexible polymer material adapted for the transport of fibers, which does not break the fibers, does not charge the fibers with static electricity, generates little friction, resists wear and tear and has good resistance to fatigue and repeated bending. The flexible tubes are for example made of a natural high-density polyethylene (PEHD), including an anti-static additive. In the absence of a metal blade, these flexible tubes may bend transversally. The metal blade is approximately 5 mm wide and about 0.5 mm thick.

As a variant, the metal blade is embedded in the thickness of a large side of the tube wall. In another embodiment, the flexible blade according to the invention constitutes one of the large sides of the flexible tube, said flexible tube being for example obtained by co-extrusion of two different materials one of which forms said flexible blade.

Figure 4:
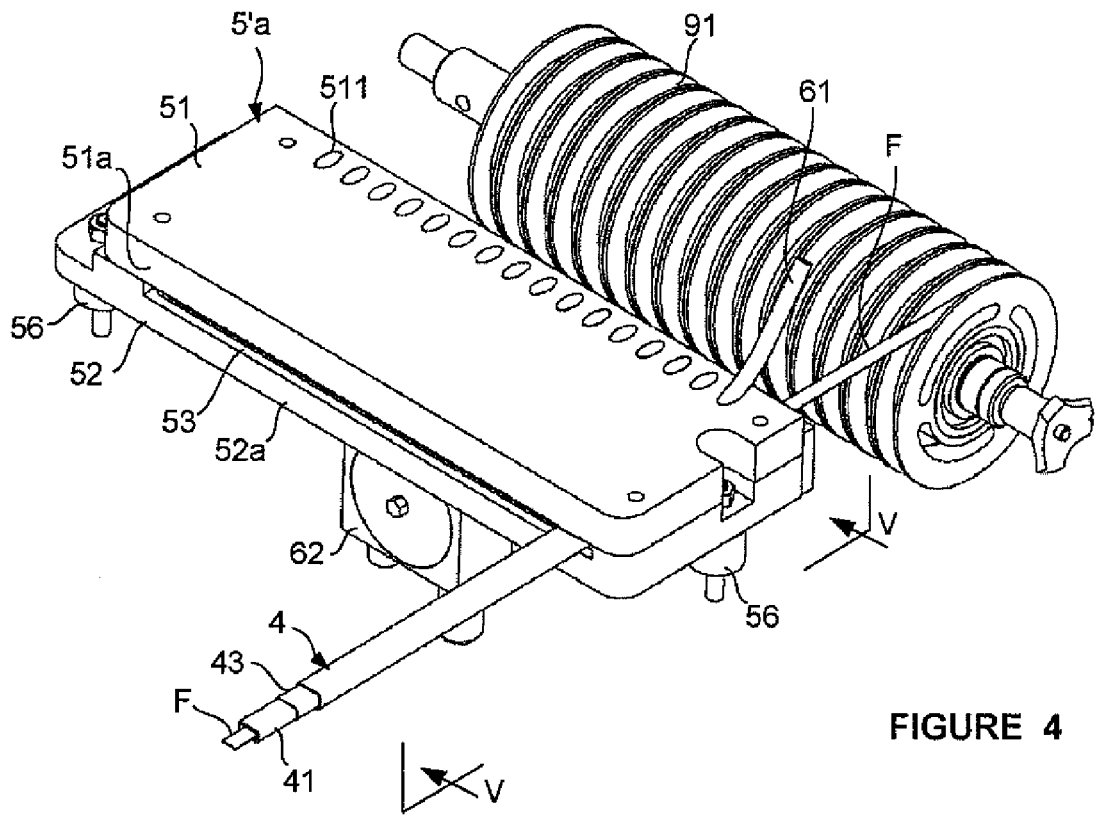
FIG. 4 is a perspective diagrammatic view of an upstream flexible tube anchoring system; and, Fig. 5 is a cross-section view along the plane V-V of the upstream anchoring system in FIG. 4.
Figure 5:
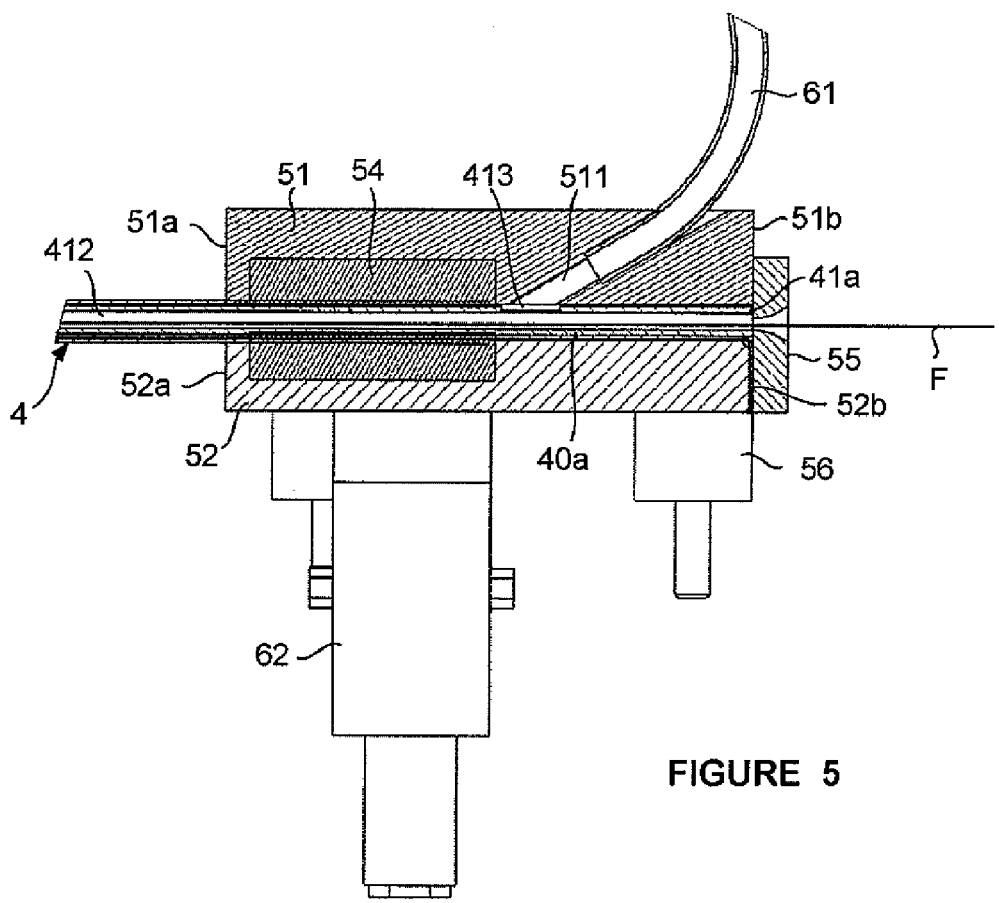

FIGS. 4 and 5 show perspective and cross-section views of the second upstream 5'a anchoring system for anchoring second tubes to the limiting system. This upstream anchoring system 5'a includes two metal plates, known as the upper plate 51 and lower plate 52, coupled to each other in order to jam together, substantially edge to edge in a row, the end parts 40a of the flexible tubes 4 fitted with their blade. The plates define between them a channel 53 for the reception of the end parts 40a of the flexible tubes, this channel extending from the front edges 51a, 52a to the rear edges 51b, 52b of the plates. Each plate includes a transverse recess in which a block 54 is housed made out of an elastomer material. When the plates are assembled, the blocks are opposite each other and slightly projecting in the channel 53, such that the flexible tubes are jammed between the two blocks. The end edges 41a of the flexible tubes 41 are aligned and flush with the rear edges 51b, 52b of the plates, Teflon eyelets 55 being mounted thereon opposite the end edges of the tubes to facilitate the entry of the fibers into the tubes.

In the embodiment shown, the anchoring system allows the anchoring of a row of 16 flexible tubes to receive the fibers of a layer of 16 fibers emerging from the tension limiting system. The anchoring system is mounted by its lower plate onto the tension limiting system such that the end edges of the tubes are placed opposite the output pulleys 91 of the limiting system.

To improve the sliding of the fibers in the flexible tubes, thereby guaranteeing good conveyance, the anchoring system 5'a is fitted with fluidization means in order to fluidize the fibers while they are transported in the tubes. The upper plate 51 includes a set of channels 511 emerging in the channel 53, upstream from the blocks 54. The end parts 40a of the flexible tubes are mounted between the two plates, with their blade 42 placed against the lower plate, said end parts being without blade and sheath 44 upstream of the blocks. Each tube is fitted with an opening 413 placed opposite a channel 511, such that each inner passage 412 of the tube emerges on a channel, the tube being without adhesive strip at said opening. These channels 511 are supplied individually with conditioned compressed air through conduits 61, partially shown in FIGS. 4 and 5, connected to a compressed air source (not shown), and the channels are orientated so as to form an upstream to downstream airflow in the inner passage of the tubes. For the transportation of pre-impregnated fibers whose adhesive aspect diminishes with temperature, cold and dry air will to advantage be injected into the flexible tubes.

To complement this airflow, a vibrating system 62, known per se, is mounted on the lower plate to make the second tube unit vibrate while the fibers are being transported. The anchoring system is then coupled to the limiting system by flexible connectors 56 of the silentbloc type to prevent the vibrations being transmitted to the limiting system.

The first upstream anchoring system 5a coupled to the creel is identical to the second upstream system 5'a described with reference to FIGS. 4 and 5, and therefore it also includes a vibrating system and air injection means. The downstream anchoring systems 5b and 5'b differ from the upstream anchoring systems in that they do not include air injection channels or vibrating system. They are however coupled to the fiber placement head and the limiting system by flexible connectors.

In the case of a placement head and/or a tension limiting system provided to receive two layers of fibers, the flexible tubes will clearly be coupled at the end in two rows, for example using two stacked anchoring systems.

As a function of the length of the conveying tubes and the fiber type, an additional limiting system may for example be built into the creel output and/or the application head input, the flexible tube sections then being anchored to these additional limiting systems.

Although the invention has been described in conjunction with different particular embodiments, it is quite clear that it is no way restricted thereto and that it includes all technical equivalents of the means described as well as combinations thereof provided they fall within the framework of the invention.

The invention claimed is:

1. A fiber application machine comprising:
    a system for displacing a fiber application head;
    fiber storage means; and
    fiber conveying means for conveying fibers from the fiber storage means to the fiber application head, the conveying means including flexible tubes connecting the fiber storage means to the fiber application head, each flexible tube adapted to receive one fiber into an inner passage of each flexible tube, the flexible tubes being anchored at an end of the fiber application head and an end of the storage means, respectively, via upstream and downstream anchoring means,
    wherein each flexible tube is fitted with at least one longitudinally flexible blade of rectangular transverse cross-section, the blade being arranged substantially parallel to a plane of transport of a fiber received in the inner passage of the flexible tube to prevent transverse bending of the tube in a plane of the blade.

2. The fiber application machine according to claim 1, wherein the at least one blade is made of metal and is integral with a flexible tube of plastic material.

3. The fiber application machine according to claim 1, wherein the at least one blade is coupled to an outer surface of the flexible tube by assembly means.

4. The fiber application machine according to claim 1, wherein the flexible tubes are of rectangular cross-section, the at least one blade being placed along one of two large dimension sides of the flexible tube.

5. The fiber application machine according to claim 1, wherein the conveying means further comprises fluidization means adapted to fluidize a fiber when the fiber is transported in the inner passage of a flexible tube.

6. The fiber application machine according to claim 5, wherein the fluidization means include air injection means adapted to inject air into the inner passage of each flexible tube so as to create an airflow in a direction of transport of the fibers.

7. The fiber application machine according to claim 5, wherein the fluidization means include vibration means adapted to make the flexible tubes vibrate.

8. The fiber application machine according to claim 5, wherein the fluidization means are mounted on the upstream anchoring means.

9. The fiber application machine according to claim 1, wherein the flexible tubes are anchored in at least one row by common upstream and downstream anchoring means.

10. The fiber application machine according to claim 9, further comprising:
   at least one tension limiting system between the fiber application head and the storage means in order to exert a tensile stress on the fibers, the flexible tubes including first sections anchored at an end of the storage means and to the limiting system, via first common upstream and downstream anchoring means, respectively, and second sections fixed at an end to the limiting system and to the fiber application head via second common upstream and downstream anchoring systems, respectively.

* * * * *

UNITED STATES PATENT AND TRADEMARK OFFICE
CERTIFICATE OF CORRECTION

PATENT NO. : 7,819,160 B2  
APPLICATION NO. : 11/740055  
DATED : October 26, 2010  
INVENTOR(S) : Hamlyn et al.

Page 1 of 1

It is certified that error appears in the above-identified patent and that said Letters Patent is hereby corrected as shown below:

Title Page, Item 73, Assignee:

Delete "Lyons" and insert --Lyon--.

Signed and Sealed this
Fourteenth Day of June, 2011

David J. Kappos
*Director of the United States Patent and Trademark Office*